United States Patent [19]

Hillestad et al.

[11] Patent Number: 5,007,778
[45] Date of Patent: Apr. 16, 1991

[54] PORTABLE POWER TOOL FOR MILLING TUBE ENDS

[76] Inventors: Tollief O. Hillestad, 108 9th Ave., W., Summerland Key, Fla. 33042; Mark W. Hillestad, 220 Hatch Rd., Wadsworth, Ohio 44281

[21] Appl. No.: 482,767

[22] Filed: Feb. 21, 1990

Related U.S. Application Data

[63] Continuation-in-part of Ser. No. 334,314, Apr. 6, 1989, Pat. No. 4,915,552, which is a continuation-in-part of Ser. No. 254,958, Nov. 7, 1988, Pat. No. 4,889,454.

[51] Int. Cl.$^5$ .............................................. B23B 45/04
[52] U.S. Cl. .................... 408/125; 408/201; 408/211; 408/702; 418/270
[58] Field of Search ............... 408/124, 125, 201, 211, 408/702; 409/138, 175; 418/259, 270

[56] References Cited

U.S. PATENT DOCUMENTS

| | | | |
|---|---|---|---|
| 2,946,315 | 7/1960 | Doeden | 418/270 X |
| 3,228,268 | 1/1966 | Strout | 408/104 |
| 3,700,363 | 10/1972 | Sorensen et al. | 418/270 |
| 3,817,649 | 6/1974 | Medney | 408/211 |
| 4,197,061 | 4/1980 | Hill | 418/270 X |
| 4,620,823 | 11/1986 | Hillestad | 409/178 |
| 4,761,104 | 8/1988 | Hillestad | 409/175 |
| 4,819,526 | 4/1989 | Geise | 82/113 |

FOREIGN PATENT DOCUMENTS

434676 9/1935 United Kingdom ............... 408/124

*Primary Examiner*—Steven C. Bishop
*Attorney, Agent, or Firm*—Daniel J. Hudak Co.

[57] ABSTRACT

A portable gas operated rotary tool is provided for milling a surface on the end of a cylindrical workpiece. The tool has a motor powered by a pressurized gas, such as compresseed air. The motor directly drives a rotary milling head which is axially aligned with the axis of rotation of the motor. The motor has a stator chamber which houses a rotor having radial slots. Vanes are journaled within said slots for radial movement within the slot and define progressively expanding cavities. The milling head has a central bore for mounting on an arbor of the motor. The milling head includes blades for milling a frustoconical surface on the workpiece and a non-locking pilot tube to align the tool with the longitudinal axis of the workpiece. An air motor design is also disclosed that provides very high rotary speeds using standard air system pressure, very high horsepower, a low polar amount of inertia and low torque. Also disclosed is a thin-walled, lightweight motor containing a sleeve therein as well as a motor having a sequentially increased exhaust port opening.

56 Claims, 9 Drawing Sheets

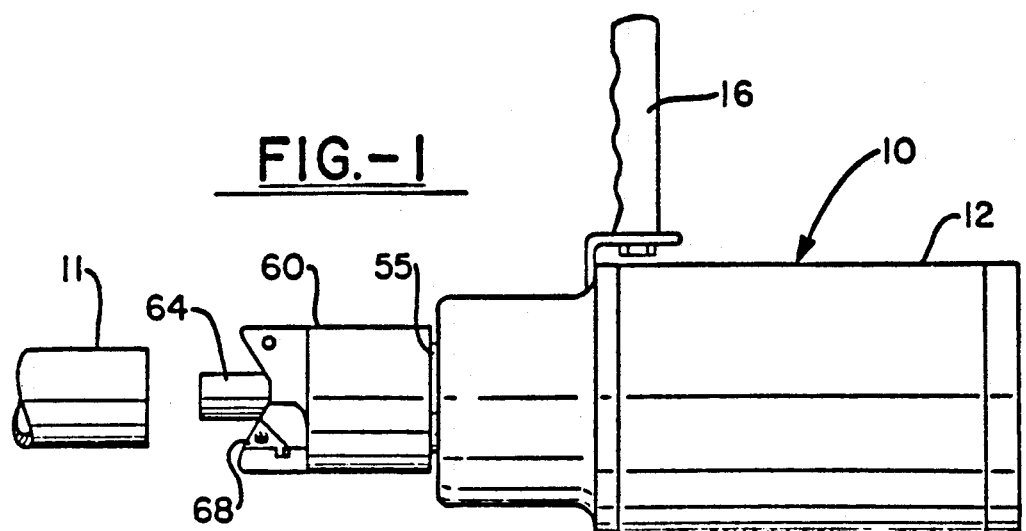
FIG.-1
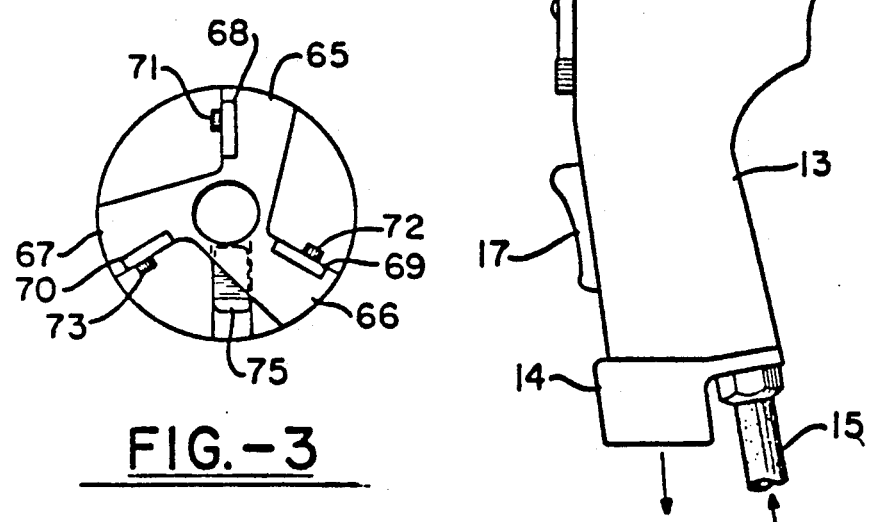
FIG.-3
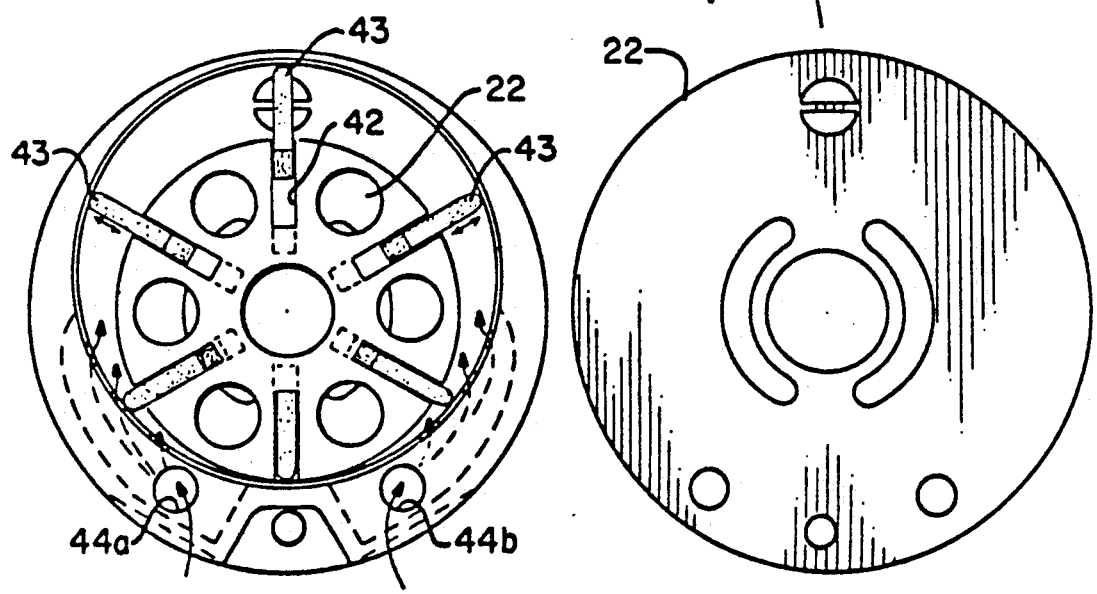
FIG-4
FIG.-5

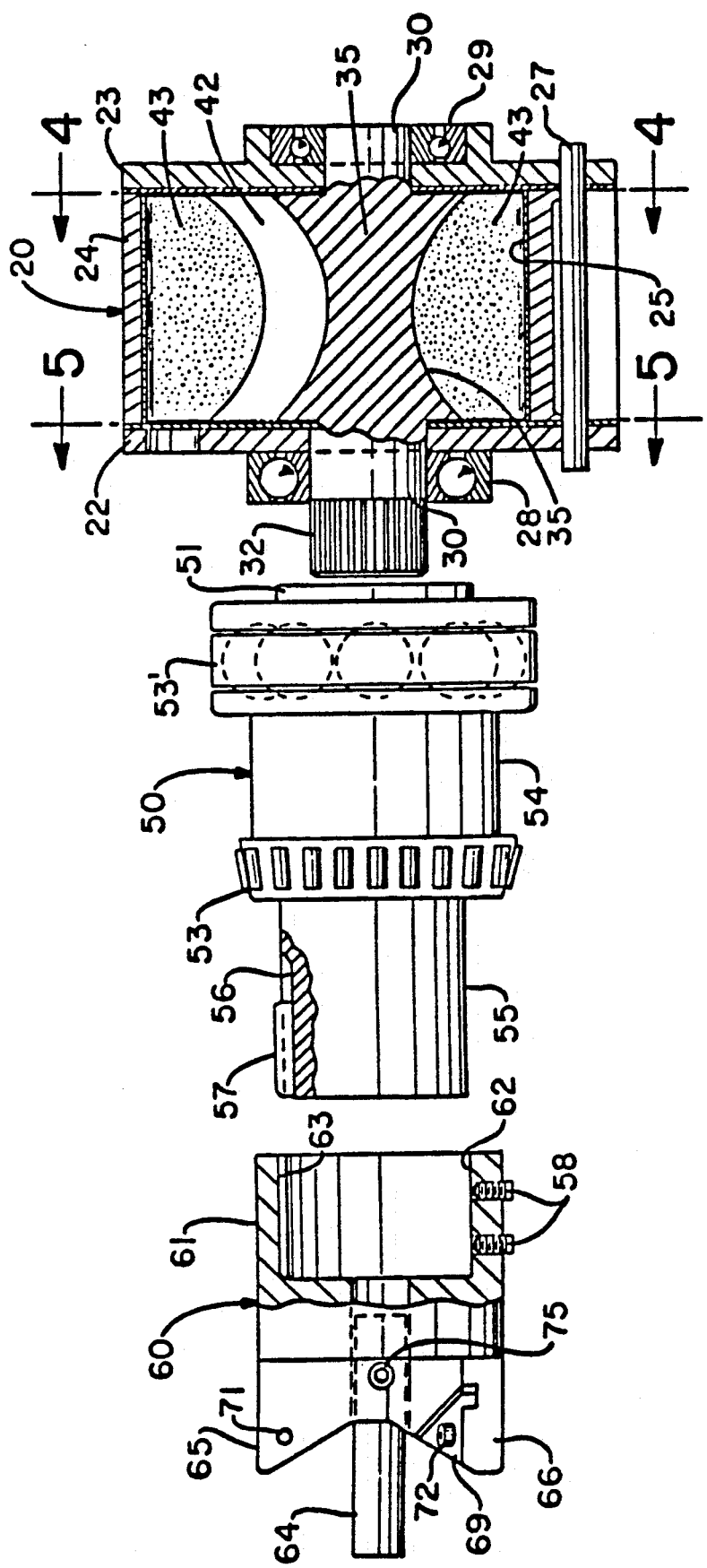

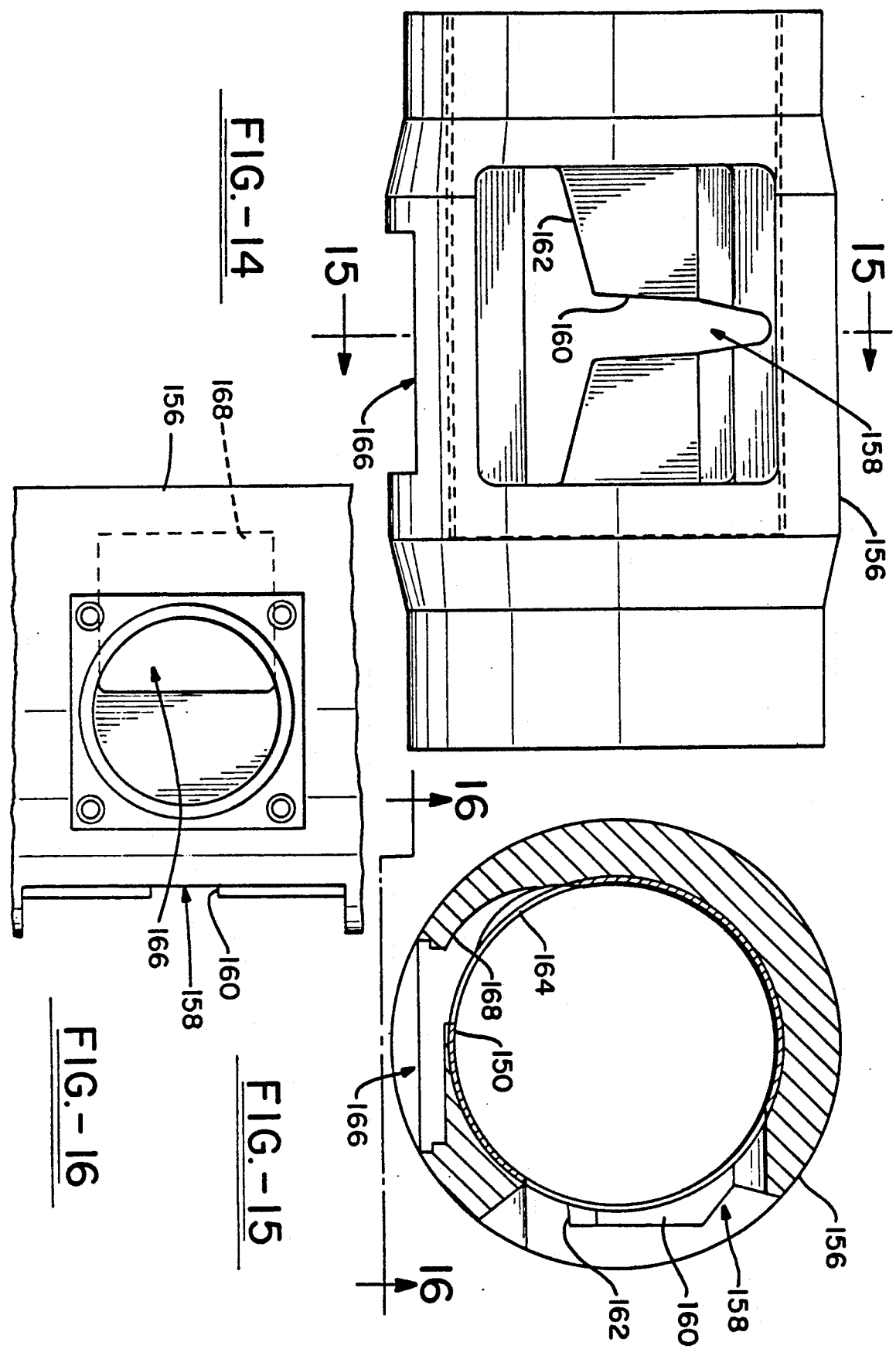

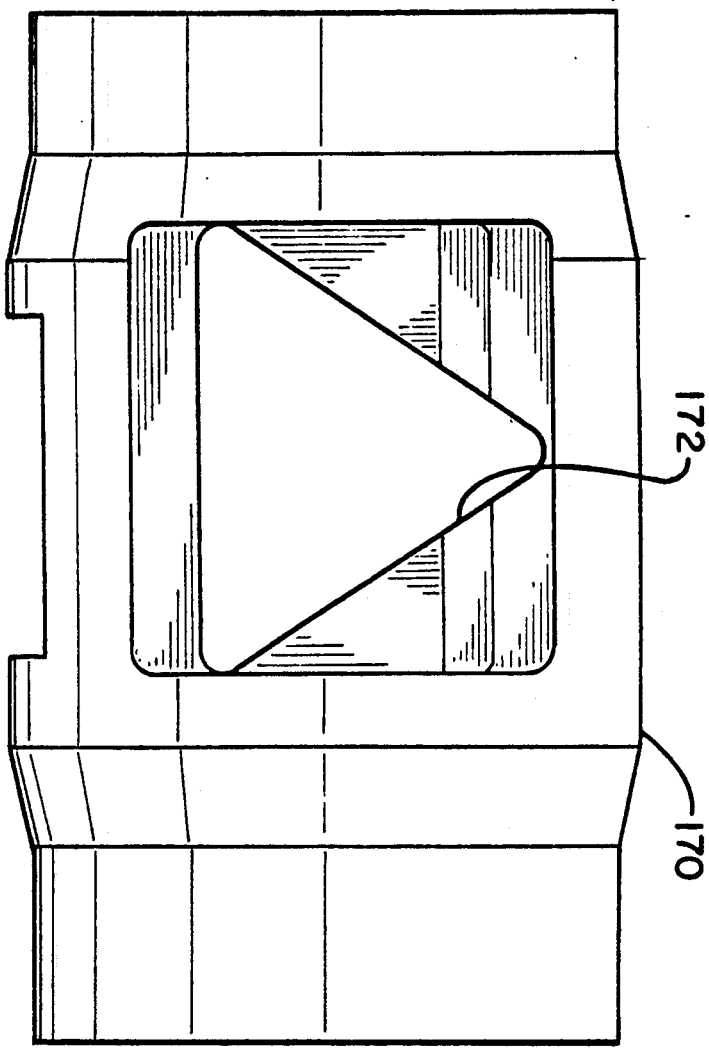

PORTABLE POWER TOOL FOR MILLING TUBE ENDS

CROSS-REFERENCE

This application is a continuation-in-part of copending application Ser. No. 07/334,314, filed Apr. 6, 1989, now U.S. Pat. No. 4,915,552, which in turn is a continuation-in-part of U.S. Pat. No. 4,889,454, issuing Dec. 26, 1989, and formerly bearing application Ser. No. 07/254,958 filed Nov. 7, 1988.

FIELD OF THE INVENTION

The present invention relates to portable power tools for milling an end surface on tubular cylindrical workpieces, such as pipes, tubes, etc. More particularly, the invention relates to air pressure-operated cutting tools with a rotary milling head adapted to mill a frustoconical bevel on the end of such tube or pipe to provide, for example, a suitable surface for welding the ends of two such tubes or pipes together in axial alignment. This invention further relates to a lightweight, high speed air motor design for the tool as well as to an air motor generally having a sequentially increased exhaust port opening.

BACKGROUND

Heretofore, it has frequently been necessary to repair various types of pipe and tube by cutting a section of the pipe out of the line and inserting a new section. Normally, the new section would be welded to the cut ends of the adjacent pipe lengths. In accordance with preferred welding practice, a groove should be provided at the point of weld to permit the molten metal to weld to a relatively large surface area of the pipes. In order to do this, the adjoining ends of the pipe lengths to be welded should be provided with a frustoconical bevel so that when the two ends are placed in alignment, a circumferential groove is formed to receive the molten metal from the welding rod.

Accordingly, the preferred practice is to mill a frustoconical bevel on the respective ends of the pipe lengths.

In many instances, such as in replacing sections of corroded pipe in a boiler, it is necessary to mill the cut end of a pipe which cannot be removed from its installed position. Accordingly, it is desirable to have a portable milling tool which the operator can carry to the desired location and accurately position in alignment with the pipe. Also, it is desirable that the tool be an air pressure-operated type tool, since many working environments might have volatile gases that could be ignited by electric arcing from an electrical power tool.

The prior art devices used for milling operations of this type have utilized an air pressure-operated motor arranged with it the axis of rotation at right angles to the axis of rotation of the milling cutter. Power is transferred from the air motor to the milling cutter through a power transfer arrangement including bevel gears, such as is shown in prior art U.S. Pat. Nos. 4,620,823 and 4,761,104. The power transfer system shown in those patents provides a substantial gear reduction so that the milling head rotates no faster than at a speed of around 100 RPM. These slow speeds require an axial guide pin that is inserted and secured in the end of the tube or pipe to stabilize the milling head during the cutting operation.

More importantly, these prior art devices with a gear reduction arrangement cause great stresses on the gear teeth and, as a result, the teeth are often damaged after only a short period of operation, requiring rebuilding of the tool.

Another problem that is encountered with prior art devices is stalling of the air motor during the grinding operation. Standard air motors used in tools of this type generally develop a high torque at a relatively low speed. Most standard air motors have a relatively large lobe to provide a high chamber expansion in a short axial length. This design provides a relatively large polar moment of inertia for the rotor and thus a relatively slow speed. The result is a high torque and a tendency to stall when too much resistance is encountered.

The tool of the present invention resolves the difficulties indicated above, and affords other features and advantages heretofore not obtainable.

SUMMARY OF THE INVENTION

An aspect of the present invention is to eliminate the need for reduction gears in air-operated, portable milling tools which are utilized to mill beveled surfaces on the ends of tubes, pipes, and the like. The construction is generally compact and less complex than heretofore constructions. Moreover, the time required to mill the beveled surface is drastically reduced.

Another aspect is to provide an improved airoperated motor for a grinding tool of the type described, wherein the rotor has a low polar moment of inertia and a low torque. Locking of the tool to the part to be ground is thus not required. The motor also has a high rotary speed and horsepower using standard air pressure.

The tool of the present invention is specifically adapted to mill or grind a frustoconical beveled surface on the end of a tubular, cylindrical workpiece (i.e., pipe or tube end) having a longitudinal axis. The tool has a housing that defines a central axis and that contains a rotary air motor mounted in its rearward end, the motor having a shaft that rotates about the central axis. A fitting is provided for supplying air under pressure through the housing to the rotary motor. Located at the forward end of the housing is a tool coupler assembly or collet that includes a spindle journaled therein and connected at its rearward end to the rotary shaft of the air motor. Located on the arbor of the spindle is a rotary milling head attachable to the coupler for rotation about the central axis. The milling head has a non-locking central pilot tube extending forwardly thereof and adapted to be inserted with close tolerances in the open end of the tube or pipe to be milled and to position the cutting head in proper axial alignment with the tube or pipe during the milling operation.

The housing is also provided with handles or other holding means so that the tool may be positioned by an operator with the central axis of the tool in alignment with the longitudinal axis of the workpiece, whereby rotation of the milling head mills a frustoconical beveled surface on the workpiece.

In a further aspect of this invention, a preferred pneumatic powered motor provides a lower polar moment of inertia and greater operating speeds with the same air pressure. In this regard, the motor contains a rotor having radial directed vanes with a smaller radial dimension and a smaller radial extension, but with a greater axial dimension to provide a vane axial length to total vane radial extension ratio between about 1.2 and 2, where the maximum radial vane extension is 0.25 inches.

In a further aspect of this invention, the pneumatic-powered motor is provided with a gas outlet port comprising a sequentially increased exhaust port opening with increasing circumferential distance from the gas inlet port. The location of the exhaust port further provides slightly reduced rotational speed of the milling head thereby providing improved wear life of milling cutter blades but still providing low stall torque.

In a still further aspect of this invention, a lightweight, sleeve-containing high speed pneumatic-powered motor is provided.

BRIEF DESCRIPTION OF THE DRAWINGS

FIG. 1 is a side elevation of a rotary air-operated milling tool embodying the invention;

FIG. 2 is a partial exploded, elevation view showing the cutting tool, and with parts broken away and shown in section for the purpose of illustration;

FIG. 3 is a front end elevation showing the milling head of FIG. 2;

FIG. 4 is a transverse, sectional view of the air motor used to drive the rotary milling tool of the invention taken on the line 4—4 of FIG. 2;

FIG. 5 is a transverse, sectional view of the air motor taken on the line 5—5 of FIG. 2;

FIG. 14 is an alternative rear elevation view of the exterior of the motor housing similar to FIG. 11, but showing an inverted T-shaped gas outlet port;

FIG. 15 is a vertical section view taken on the line 15—15 of FIG. 14;

FIG. 16 is a bottom view taken on the line 16—16 of FIG. 14 and showing a gas inlet port; and FIG. 17 is an alternative rear elevation view of the exterior of the motor housing similar to FIG. 11, but showing a triangular gas outlet port.

DETAILED DESCRIPTION OF THE INVENTION

Figure 6:
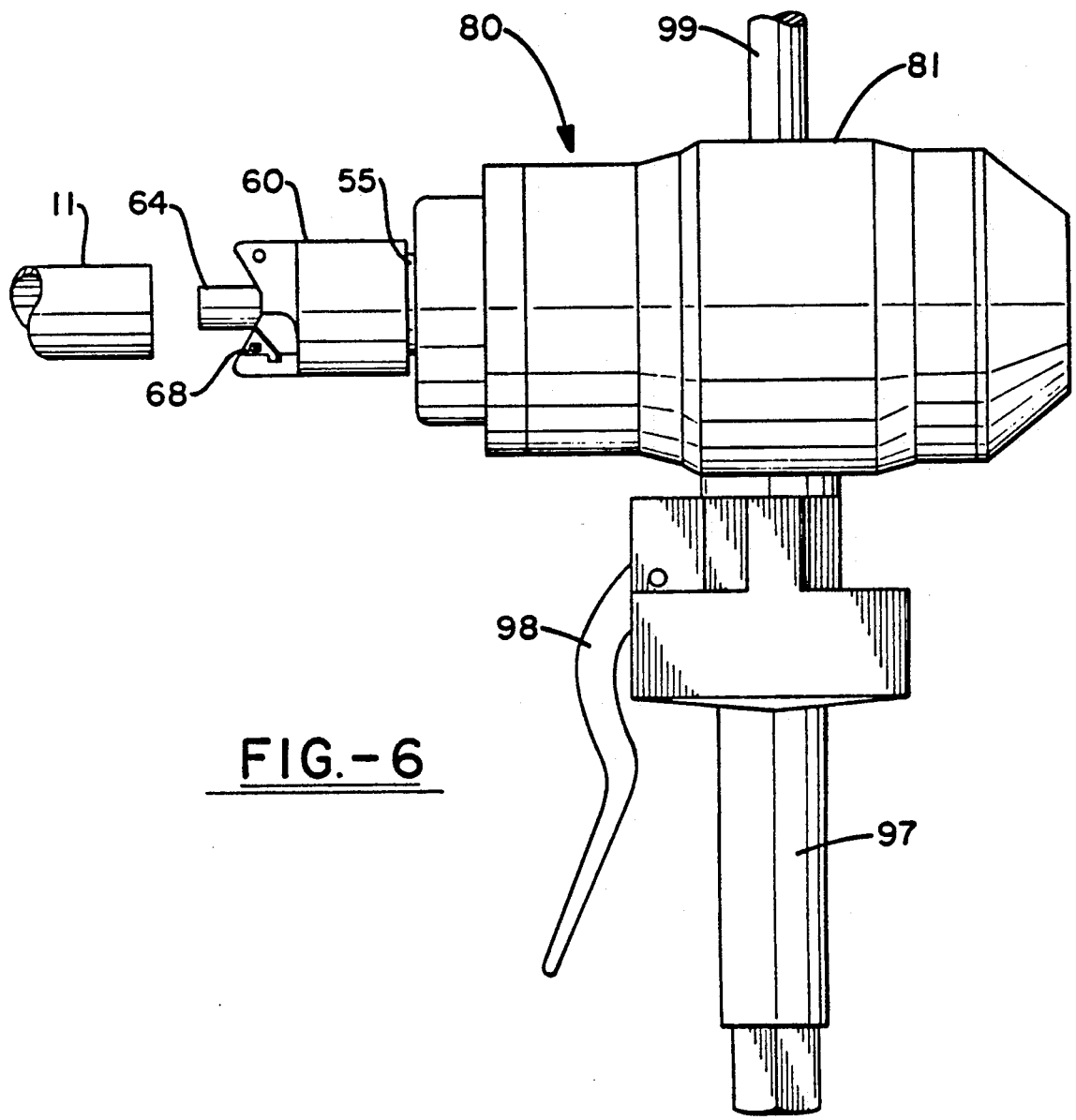
FIG. 6 is a side elevation of another form of rotary air-operated milling tool embodying the invention.

Referring more particularly to the drawings, and initially to FIG. 1, there is shown a portable rotary cutting tool 10 for milling a frustoconical end surface on an open end of tubular, cylindrical workpieces 11 such as pipes, tubes, etc. The tool includes as its principal components a cylindrical housing 12, an air motor assembly 20, a spindle assembly 50, and a milling head 60.

The cylindrical housing 12 has a pistol grip handle 13 attached thereto with a hose fitting 14 at its outer end and adapted to receive a pressure hose 15 which is pressured by a gas, such as compressed air. Extending from the opposite side of the housing is a stabilizer handle 16. An operator of the tool holds the tool with both hands and actuates the motor by means of a switch on the handle 13 which actuates a solenoid valve which controls the pressure line from an air compressor. The operator places the tool 10 with the milling cutter 60 in axial alignment with the tube or pipe 11 and, while holding the tool correctly in position, actuates the air motor to initiate the milling operation and to cut a beveled surface on the end of the pipe 11.

The air motor assembly 20 includes a stator with a front plate 22, a rear plate 23, and a cylindrical stator ring 24 (FIG. 4). The front plate 22, rear plate 23 and stator ring 24 are all provided with a brass liner to define the eccentric stator chamber 25. The various components of the stator are held in proper alignment by a locator pin 27. A forward bearing assembly 28 is located adjacent the outer surface of the front plate 22 and another bearing assembly 29 is formed integrally with the rear plate 23. The bearings 28 and 29 serve to journal the rotor shaft 30 at its opposite ends.

The rotor shaft 30 has its forward end that is journaled in the bearing assembly 28, provided with a forwardly extending splined section 32. The rearward end of the rotor shaft is journaled in the bearing assembly 29. A rotor 35 is located within the stator chamber 25. The chamber 25 has a circular cross-section but is eccentric with respect to the axis of rotation of the rotor 35, which coincides with the axis of the rotor shaft 30. Rotor 35 is desirably lightweight and made from a lightweight material such as aluminum, e.g., as from aluminum bar stock. Moreover, stator chamber 25 can also be made from aluminum. The rotor and optionally the stator is hardened and desirably has a Rockwell A hardness of at least 50 and preferably at least 58.

The rotor 35 is provided with six symmetrically spaced radial slots 42, each of which receives a radial vane 43 having a convex inner surface. The floor of each slot 42 has a curved shape that coincides with the convex inner surface of a vane 43. When the motor is engaged, the vanes are forced outward so that the outer surface bears against the inner surface of the chamber 25. The vanes 45 divide the chamber 25 into asymmetrical lobes.

The vanes 43 slide in radial directions between a retracted position in the slot where the straight distal surface of the vane bears against the surface of the stator chamber at the shortest radial distance. As the rotor turns in a clockwise direction, the radial vanes 43 move radially outward to maintain engagement with the surface of the lobed chamber 25 until they reach the maximum extension illustrated at the upper portion of the lobe as shown in FIG. 4. Accordingly, the radial vanes 43, the outer surface 41 of the rotor 35, and inner surface of the stator chamber define progressively expanding cavities, i.e. the lobes. The resulting expansion of the compressed air produces continuous rotation of the rotor.

Compressed air enters the lobed stator chamber 25 at an inlet 44a or 44b, respectively, formed at the bottom of the stator ring 24 and exits through an exit port 45 formed in the front plate at the top of the chamber. The air enters through 44a for a clockwise rotation of the rotor and through 44b for counter clockwise rotation.

The air motor thus described is adapted to turn at speeds of between 4500 and 5000 RPM.

FIG. 2 shows the spindle assembly 50 which includes a spindle shaft 51 with a recess formed at its inner end and having internal splines. The internal splines mesh with the splined end 32 of the rotor shaft 30 to couple the spindle assembly to the motor.

The assembly includes bearing units 53 and 53' which are mounted in a spindle housing 54 and in which the spindle is journaled. The forward end of the spindle has an arbor 55 with a longitudinal slot 56 that receives a key 57.

The milling cutter 60 is removably secured to the arbor and may be quickly removed so that different sized milling cutters for different size pipe, etc. may be easily mounted and replaced on the arbor. The cutter has cylindrical body 61 with a bore 62 formed in its rearward end. The bore has a longitudinal slot 63 that cooperates with the key 57 seated in the slot 56 to lock the cutter to the arbor. The cutter 60 is also retained against axial movement on the arbor 55 by set screws 58 located in threaded radial bores in the body of the cutter.

Located in an axial bore in the forward end of the body 61 is a pilot tube 64 which is adapted to be inserted in the open end of the pipe 11 to help position the milling cutter correctly during the milling operation. The pilot tube is secured in the body 61 by a set screw 75 located in threaded radial bores in the body.

Also formed in the forward end of the milling cutter are three symmetrically arranged, axially extending radial blade supports 65, 66, and 67 that extend in a forward direction. Each of the blade supports 65, 66, and 67 has a cutting blade 68, 69, and 70 secured thereto with set screws 71, 72, and 73. Accordingly, the cutting blades 68, 69, and 70 may be replaced on the end of the milling cutter when they become worn.

Operation

The operation of the tool thus described will be considered as beginning at a point when an appropriate milling cutter 60 has been mounted on the arbor 55 and the pressure hose 15 has been connected to the tool. The operator holding the tool by one hand on the pistol grip 13 and with the other hand in the stabilizer handle 16 lifts the tool and aligns it with the open end of the pipe 11 to be milled. The pilot tube 64 is inserted in the open end of the pipe 11 to help support the tool 10 in axial alignment. Then the operator presses the switch 17 to actuate the air motor 20 to begin the high-speed turning of the spindle assembly 50. A typical rotary speed for the tool is from about 2,500 RPM to about 6,000 RPM and preferably from about 4500 to about 5000 RPM. While the pilot tube 64 must rotate within the open end of the pipe, sufficient clearance is provided that there is a minimum friction resisting rotation of the pilot tube.

With the tool in this condition, the operator moves the milling cutter 60 forward until the blades 68, 69, and 70 engage and begin to cut or mill a beveled surface in the open end of the pipe 11. Because of the high speed of the tool that results from a unique arrangement of the air motor 20, spindle assembly 50, and milling cutter 60, a frustoconical surface may be milled within five seconds. This represents a substantial improvement over prior art devices, which generally required about one minute to place the same beveled surface on the end of a pipe. Once the beveled surface has been milled, the operator retracts the pilot tube 64 from the end of the pipe and deactivates the air motor. Another important advantage is that various reduction gears which are generally utilized in prior art devices have been eliminated thereby resulting in weight reduction, cost savings, and the like.

Figures 7, 8:
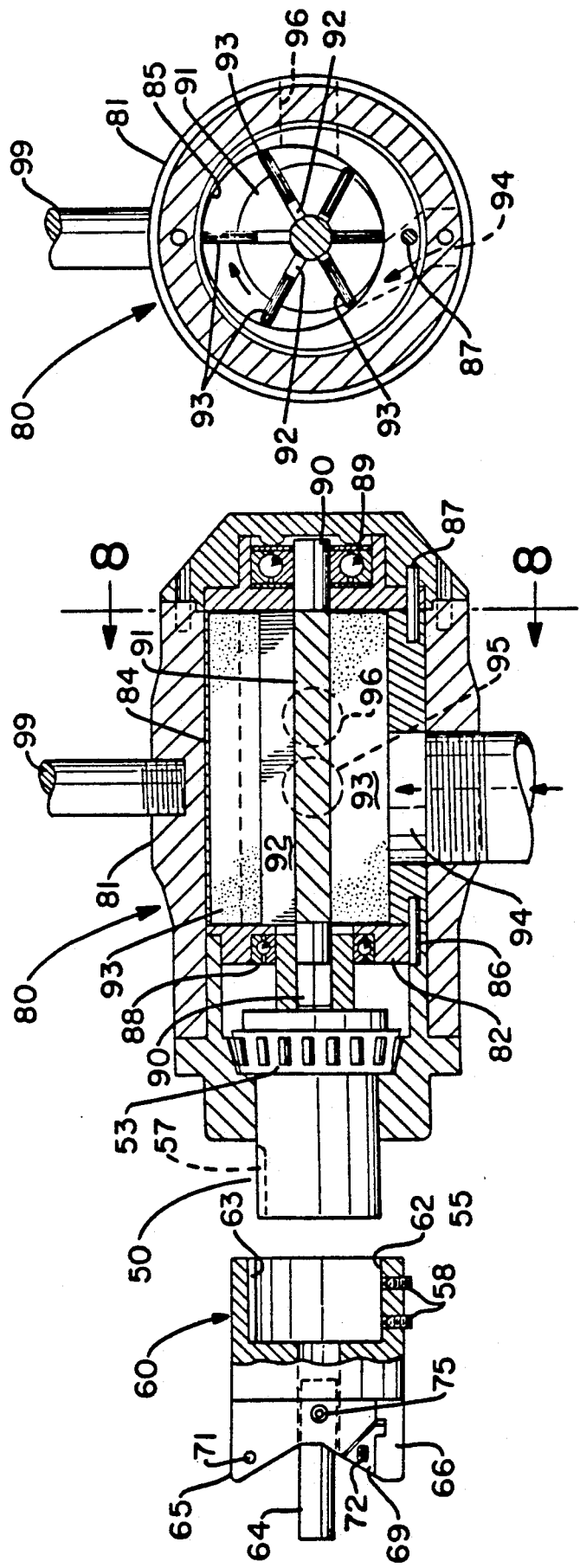
FIG. 7 is a partially exploded, sectional view showing the milling tool of FIG. 6 with parts broken away for the purpose of illustration.
FIG. 8 is a transverse sectional view taken on the line 8—8 of FIG. 7.

FIGS. 6, 7 and 8

FIGS. 6, 7 and 8 illustrate another form of the invention wherein the tool assembly includes a uniquely designed air motor that differs from the air motor assembly 20 shown in FIGS. 1 through 5. The air motor 20 is essentially a standard commercially available air motor generally operating at speeds of about 3,500 RPM. The air motor illustrated in FIGS. 6 through 8 and in fact in FIGS. 9 and 10 as well, is identified by the numeral 80 and is designed to minimize the lateral dimensions or diameter of the motor while at the same time achieving higher rotational speeds.

The air motor assembly 80 has a housing 81 that receives an elongated generally cylindrical stator closed at its axial ends by a front plate 82 and a rear plate 83. Located between the plates 82 and 83 is a cylindrical stator ring 84 that defines an eccentric stator chamber 85. The front plate 82, rear plate 83 and stator ring 84 are all secured and retained within the housing 81 and are located in a predetermined relation by means of a front locator pin 86 which keys the front plate to the stator ring 84 and a rear locator pin 87 which keys the rear plate 83 to the stator ring 84.

A forward bearing assembly 88 is located adjacent the outer surface of the front plate 82 and another bearing assembly 89 is formed integrally with the rear plate 83. The bearing assemblies 88 and 89 serve to journal the rotor shaft 90 at its opposite ends.

The rotor shaft 90 has its forward end journaled in the bearing assembly 88 and is also provided with a forwardly extending splined section. The rearward end of the rotor shaft 90 is journaled in the bearing assembly 89. A rotor hub 91 integral with the shaft 90 is located within the stator chamber 85. As indicated above, the stator chamber 85 has a circular cross section but is eccentric with respect to the axis of rotation of the rotor shaft 90.

The rotor hub 91 is desirably made from a lightweight material such as aluminum. The stator ring 84 and front and rear plates 82 and 83 are also desirably made of aluminum and are preferably hardened to provide a Rockwell Hardness of at least 50 and preferably at least 58.

The rotor hub 91 is provided with six symmetrically spaced, radial slots 92 each of which receives a radial vane 93. The vanes have a generally rectangular shape and the slots are also rectangular and coincide with the respective dimensions of the vanes.

When the motor 80 is energized, the radial vanes 93 are forced outwardly so that their outer surfaces bear against the inner surface of the stator chamber 85. The vanes 93 slide in radial directions between a retracted position in the slot wherein the distal surface of the vane bears against the surface of the stator chamber at the shortest radial distance. As the rotor hub turns in a clockwise direction, the radial vanes 93 move radially outward to maintain engagement with the surface of the eccentric stator chamber 85 until they reach the maximum extension at the upper portion of the lobe as shown in FIG. 8. Accordingly, the radial vanes 93, the outer surface of the rotor hub 91 and the inner surfaces of the stator chamber 85 define progressively expanding elongated cavities. The resulting expansion of the compressed air produces continuous rotation of the rotor.

Compressed air enters the stator chamber 85 at an inlet port 94 formed in the housing 81 at the bottom of the stator ring 84 and exits through a pair of circular exhaust ports 95 and 96 that extend through both the stator ring and housing and which are located at a point that is spaced between about 180 degrees and 270 degrees of rotor rotation from the inlet port 94. More desirably, a rotor rotation of about 180 degrees to about 245 degrees is preferred.

Because the exhaust ports 95 and 96 are not diametrically opposed to the inlet port 94 but rather spaced substantially therefrom, the motor is capable of operating only in a clockwise direction. It cannot be reversed to provide counter clockwise rotation as can the motor assembly 20 of FIGS. 1 through 5.

The air motor assembly 80 is energized by means of an air valve located in a handle assembly 97 and manually activated by means of a valve lever 98. An additional grip 99 is secured to the housing 81 opposite the handle assembly 97 to assist the operator in holding and operating the tool.

The splined forward end of the shaft 90 is coupled to a spindle assembly 50 and thus to the milling cutter 60. The spindle assembly 50 and cutter 60 are identical to those shown and described with respect to the tool assembly of FIGS. 1 through 5.

It will be apparent from a comparison of the air motor assembly 80 with the air motor 20 that the unique construction of the assembly 80 affords a lower polar moment of inertia and thus is inherently capable of operating at greater speeds with the same air pressure, the standard operating air pressure being about 90 psig. The lower polar moment of inertia is achieved by using radial vanes with a smaller radial dimension and smaller radial extension but with a greater axial dimension. Thus, the improved operational capabilities are achieved by having a larger ratio of vane axial length to total vane radial extension, desirably a ratio between about 1.2 and 2.0, and preferably between 1.4 and 1.8. The total vane radial extension distance is the distance from one vane in a fully closed position to an opposed (180 degrees) vane in a fully extended position, that is the diameter of stator chamber 85. The actual maximum radial extension of the vane to the diameter of the rotor hub is from about 0.02 to about 0.25, desirably from about 0.05 to about 0.20 and preferably from about 0.1 to about 0.15.

In the air motor assembly 80 illustrated in the drawings, the actual length of the rotor hub is 4.4 inches and the maximum travel of the radial vanes 0.365 inches. This permits rotary speeds of between about 5,000 to about 7,000 RPM and preferably from about 6,000 to about 7,000 using standard air pressure (i.e., about 90 psig).

The higher RPM along with the design of the air motor enables the motor assembly to achieve a horsepower rating in excess of 5 horsepower and preferably about 5.8 horsepower. With the design described, the motor has relatively low torque and thus is vulnerable to stalling. The low torque aspect is actually a safety feature since upon stalling the milling tool will not turn or twist an operator's hand. Inasmuch as the motor assembly rotates at high speed but has low torque, central pilot tube 64 while although matingly engaging a workpiece is not secured or locked thereto. Rather, a small clearance exists such as on the order of approximately 0.020 inch and the pilot tube turns with the milling head. Thus, an accurate but non frictional alignment is achieved. The net result is that the milling time required to mill a tube or the like is drastically reduced. For example, milling of tube ends can be achieved using the air motor 80 within a matter of seconds. Under actual operating conditions, tube ends have been milled in generally under 30, desirably under 20 seconds, and preferably under 10 seconds and in some cases even within 3 to 5 seconds. This compares favorably with the milling times required for prior art air-operated milling tools which required from 2 to 3 minutes for each milling operator.

Figure 9:
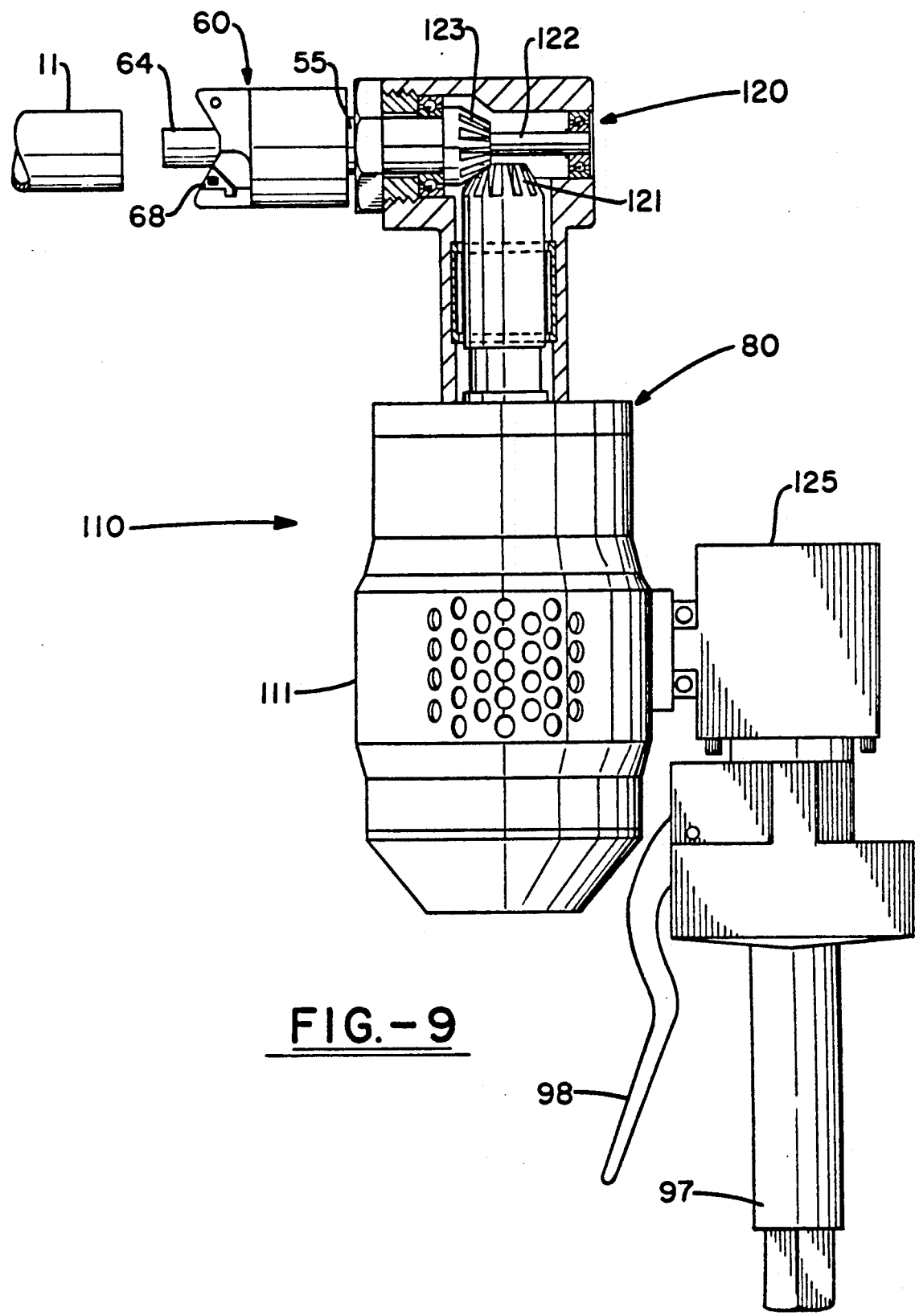
FIG. 9 is a side elevation of still another form of rotary air-operated milling tool embodying the invention.
Figure 10:
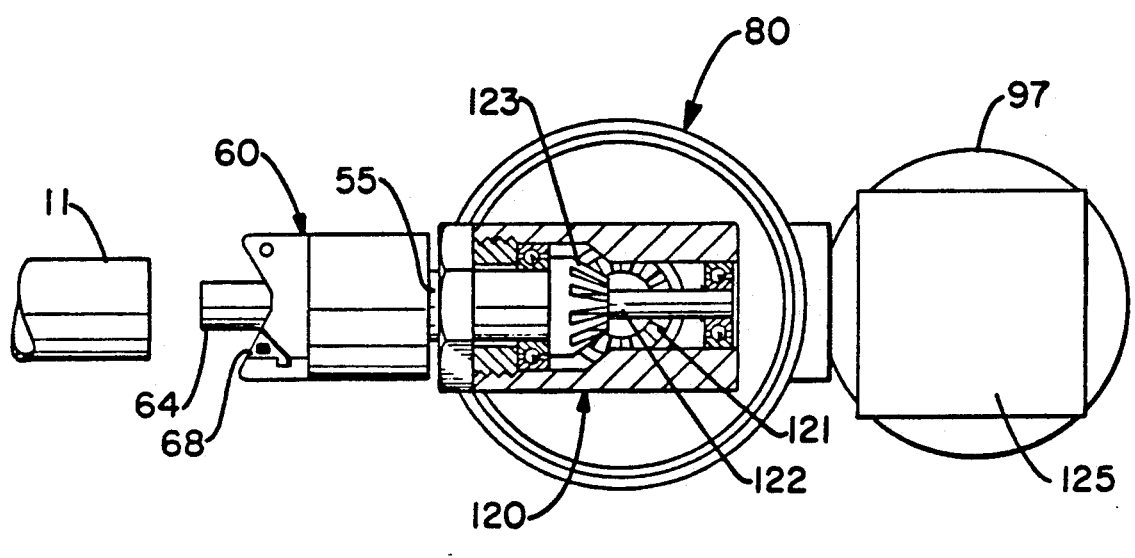
FIG. 10 is a top elevation of the milling tool of FIG. 9 with parts broken away for the purpose of illustration.

FIGS. 9 and 10

FIGS. 9 and 10 illustrate still another form of milling tool assembly 110 embodying the invention but where in the configuration of the tool is changed to accommodate a different type of milling environment. The tool assembly 110 of FIG. 9 minimizes the axial length required for the milling operation, with references to the axis of the tube 11 to be milled. In other words, the tool is adapted for use when insufficient axial space would be available for using the tool of either FIGS. 1 through 5 or 6 through 8.

The tool assembly 110 has a housing 111 which contains an air motor assembly that is essentially identical to the air motor assembly 80 of FIGS. 6 through 8. The principal difference is that the output from the air motor is to a shaft on which is keyed a right-angle-drive output head 120 with a bevel gear 121 formed at its outer end. The bevel gear is located in a right-angle-drive transfer housing in which is journaled a shaft 122 for another meshing bevel gear 123.

As will be apparent, the axis of the shaft 122 is at right angles to the axis of the air motor and its output drive. The milling head 60 is connected to an output shaft of the bevel gear 122 in the same manner as before.

Another aspect of the tool assembly 110 is the means for connecting the air motor assembly 80 to the handle assembly 98 with the air valve located thereon. The handle assembly 97 is actually connected to an adapter 125 which has one side thereof connected to the housing 111 at the location of the inlet port of the air motor. This arrangement assists in achieving a minimal space profile for the tool assembly 110 as will be apparent by comparison of the device of FIGS. 9 and 10 with the device of FIGS. 6 through 8.

FIGS. 11-17

Referring now to FIGS. 11-17, shown generally is a compact, lightweight, pneumatic motor 130 substantially free of lost space within the motor housing 132 due to the relative axial placement of the cylindrical stator 134 and rotor hub 136 within the motor housing 132 in conjunction with a novel exhaust port means of generally sequentially increased size with increasing circumferential distance from the gas inlet port. That is, as the circumferential distance from the gas inlet port increases, the exhaust port means generally increases in size whether constantly, abruptly, exponentially, or the like.

Figures 12, 13:
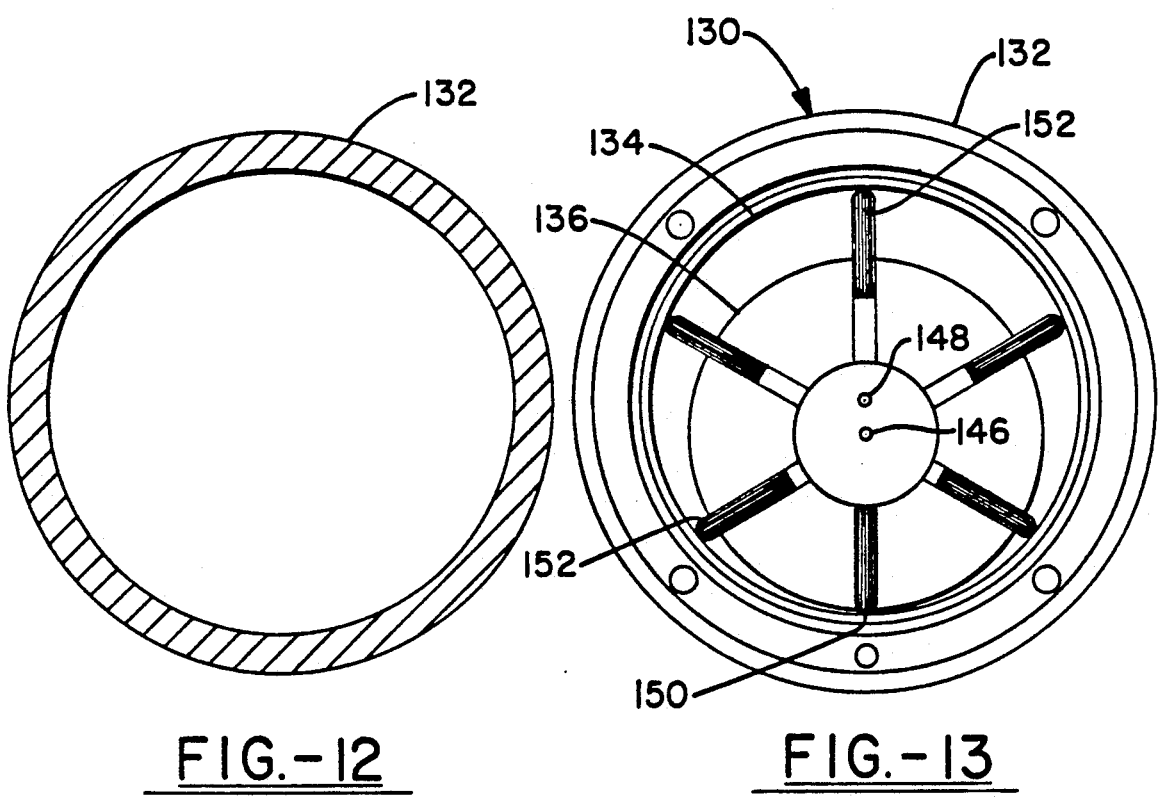
FIG. 12 is a vertical sectional view taken on the line 12—12 of FIG. 11.
FIG. 13 is a vertical sectional view taken on the line 13—13 of FIG. 11.

As seen in FIG. 12, housing 132 is very thin and is made of a very light metal such as aluminum, magnesium, and the like. In order to impart structural integrity and strength to the interior portion of the housing, it contains a thin metallic sleeve 134 as made out of steel or other strong material. The thickness of the sleeve 134 is from about 0.01 to about 0.15 inches with from about 0.035 to about 0.050 inches being preferred. Although steel weighs more than the aluminum, the sleeve is thin and yet imparts sufficient strength so that the overall aluminum housing 132 can be sufficiently narrow or thin such that the weight of the overall motor is substantially reduced, as by at least 20 percent and preferably at least 45 percent, from the motor set forth in FIG. 7. The sleeve can be applied to housing 132 in any conventional manner. For example, the housing can be heated with sleeve 134 being press-fit therein and the housing subsequently cooled. The net result is a tightly held sleeve which is stationary.

While the embodiment of FIGS. 6-10 resulted in a motor providing very high rpm and low stall torque essentially so that the motor would readily stall and thereby prevent injury to an operator, the rpm tends to be too high such that the cutting blades of the milling head are susceptible to undue wear. In order to prevent such wear, the rpm of the motor has been decreased by providing a sequentially increased exhaust port whereby an initial amount of pneumatic fluid, for example spent gas, in the recompression cycle is released in a circumferential distance of about 180 degrees to about 270 degrees from the inlet port, i.e. a third quadrant, and a substantially larger amount is released generally beyond about 270 degrees from the inlet port, i.e. a fourth quadrant. Three different embodiments of such a sequential increased exhaust port are shown in FIGS. 11-17 and specifically in FIGS. 11, 15, and 17. As a generalization, the area of the exhaust ports generally within the third quadrant is such that up to about 25 percent of the spent gas is vented through the preliminary or first-stage, that is the third quadrant, desirably from about 5 to about 22½ percent, and preferably from about 15 to about 20 percent, with a large majority of the remaining gas being vented through the opening(s) generally located in the fourth quadrant. Such a progressive, sequential or two-stage exhaust means prevents undesirable recompression of the spent or expended gas and yet permits sufficient gas to be retained within the motor such that the RPM is slightly reduced in comparison with the embodiments set forth in FIGS. 6 through 10, thereby providing dramatically increased blade cutting life of the milling head. Such sequentially increasing exhaust ports further permit slightly increased power to be obtained and yet maintain sufficiently low torque such that the motor is still readily stallable. As a result, The RPM of the motor is from about 3,000 to about 6,000 and preferably from about 4,000 to about 5,000 using standard air pressure, i.e. about 90 psig. Another distinct advantage of the progressively spaced or sequentially increased exhaust port means is the considerable reduction in noise level due to the progressive expulsion of gas rather than an abrupt expulsion.

Figure 11:
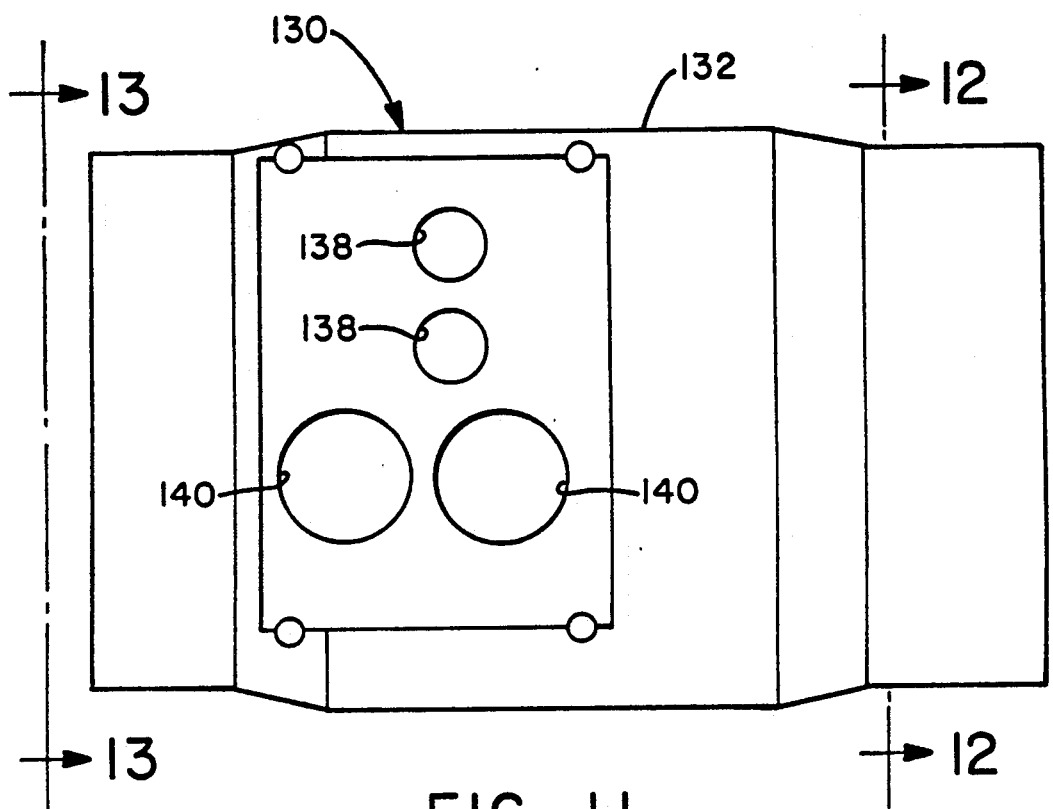
FIG. 11 is a rear elevation view of the exterior of the motor housing similar to the housing shown in FIG. 7, but showing a plurality of variable size gas outlet ports.

FIG. 11 is a rear elevation view of the motor housing 132 similar in external appearance to the motor housing shown in FIG. 7, but particularly containing a sequentially increased exhaust port means comprising a pair of circumferentially spaced, small, circular exhaust ports 138 and a pair of longitudinally spaced, large, circular exhaust ports 140 circumferentially spaced from the small exhaust ports 138. The small exhaust ports 138 of the sequentially increased exhaust ports 138,140 are circumferentially spaced at least 180 radial degrees from the gas input port where preferably the small exhaust ports 138 are in the third quadrant, i.e. from about 180 degrees to 270 degrees, and preferably the large exhaust ports 140 are located in the fourth quadrant, that is from about 270 degrees to about 330 degrees relative to the gas input port. The gas is thus exhausted in the embodiment of FIG. 11 in an abruptly increased amount. The purpose of the progressive venting or exhaust system is to initially vent only a portion of the spent gas, as up to about 25 percent by volume, through the small exhaust ports 138, and then subsequently vent a significant amount of the remaining spent gas through the large exhaust ports 140. The diameter of each small exhaust port 138 shown in FIG. 11 is approximately one-half the diameter of each large exhaust port 140, whereby the area of the two small exhaust ports 138 is approximately one-fourth the area of the two large exhaust ports 140. Generally, the area of each small exhaust port can be from about ⅛ to about ⅓ of the area of each large exhaust port.

FIGS. 12 illustrates compact axial placement of the circular rotor hub 136 and the cylindrical stator as defined by sleeve 134 within the compact, lightweight motor housing 132 in FIG. 11, whereby the interior of the motor housing is substantially free of lost space and, as shown in FIG 12, the housing can be relatively thin. Thus, in contrast to the motor 80 shown in FIG. 4 and 8 wherein the longitudinal axis of the rotor hub 91 coincides with the axis of the cylindrical motor housing 81, the longitudinal axis 148 of the rotor hub 136 in FIGS. 11-16 is vertically offset or displaced from the longitudinal axis 148 of the motor housing 132. Such offset of the axis of the rotor as compared to the stator opening results in dramatic weight reductions often times in excess of 40 and even 50 percent. Thus, a trim, lightweight compact pneumatic motor in accordance with this aspect of the invention is provided.

The longitudinal axis 146 of the smaller rotor hub 136 is vertically displaced relative to the longitudinal axis 148 of the larger cylindrical stator sleeve 134 in such a manner as to provide an engaging sealing point 150 between engaging surfaces of the rotor hub 136 and the cylindrical stator sleeve 134 whereby a gas inlet port is located adjacently on one side of the sealing point 150 while the exhaust port is located on the other side of the sealing point 150. The rotor hub 136 contains a plurality of circumferentially spaced, radially directed recesses or slots containing a radial vane 152 in each slot. The radially directed vanes 152 are adapted to slide within the radial slots during operation of the motor 130 in a manner similar to motor 80 shown in FIGS. 7 and 8, whereby the distal ends of the radial vanes 152 maintain contact with the interior surface of the cylindrical stator sleeve 134 at maximum extension of the vanes 152. The radial vanes 152, in conjunction with the outer peripheral surface of the rotor hub 136 and interior surface of the cylindrical stator sleeve 134, define a plurality of chamber cavities between adjacent vanes 152 where such chamber cavities progressively expand upon rotation of the rotor 136 in a manner similar to the motor 80 shown in FIGS. 7 and 8. Low polar moment of inertia is obtained by providing radial vanes 152 with a considerably smaller radial extension, but with a greater axial length. Thus, as in FIGS. 7 and 8, preferred structures as shown in FIGS. 12 and 13 comprise a vane axial length ratio to total radial vane extension, that is the total diameter between one side of the stator wherein the vane is fully closed to the other side of the stator wherein the vane is fully extended (i.e., the interior motor stator diameter) of from about 1.2 to about 2.0, and preferably between 1.4 and 1.8, with the ratio of the radial extension of the vane to the rotor hub diameter being from about 0.02 to about 0.25, desirably from about 0.05 to about 0.20, and preferably from about 0.1 to about 0.15. The actual vane axial length and overall radial extension width, that is, stator diameter, as well as the actual vane extension of the rotor, will naturally vary with the size of any particular pneumatic motor. If desired, lower polar moment of inertia and greater operating speeds can be achieved by increasing the axial dimension of the vanes 152 and thereby increasing the exposed area of the extended vanes 152 while reducing the overall size of the motor housing 132.

Referring now to FIGS. 14, 15, and 16, shown is an alternative motor housing 156 similar to the motor housing 132 shown in FIGS. 11 to 13, but containing a sequentially increased exhaust port 158 increasing in exhaust area with increasing circumferential distance from the gas input port and located in the external rear wall of the motor housing 156. The progressively expanding exhaust port 158 generally comprises an inverted T-shape opening containing an elongated circumferential opening 160 communicating with an enlarged transverse longitudinal opening 162. The gas is thus generally exhausted in an exponential manner. The purpose of the progressively increasing exhaust port 158 is the same as the structure shown in FIG. 11 in that minor amounts of spent gas are exhausted in the third quadrant to avoid recompression of trapped air while retaining a majority of the gas is exhausted in a circumferential distance of from about 270 degrees to about 330 degrees from the inlet port. Up to about 25 percent of the spent gas can be vented through preliminary or first-stage, circumferential opening 160 and the remaining majority of the spent gas can be vented through the longitudinal opening 162.

FIG. 15 is a cross-sectional view of the housing 156 taken along line 15—15 in FIG. 14, but with the rotor hub removed, and is of the same configuration and structure of the stator and rotor shown in FIGS. 12 and 13. Adjacently left of the contact seal joint 150 between the stator sleeve 134 and the rotary hub 136 is a gas input port 164 communicating with the interior of the cylindrical stator sleeve 134 and interconnected with an external source of compressed gas (not shown), typically compressed air.

FIG. 16 is a bottom view of the external opening 166 in the motor housing 156 which interconnects by an internal channel 168 with the gas in input port 164. In FIG. 15, the exhaust port 158 communicates with the interior of the cylindrical stator sleeve 134 and is located at least 180 radial degrees from the gas input port 164. The elongated circumferential opening 160 is located predominantly in the third quadrant, while the enlarged longitudinal opening 162 is typically located in the fourth quadrant, i.e. from about 270 degrees to about 330 degrees. In operation, compressed gas, usually air, enters the cylindrical stator through the gas input port 164. The compressed gas impinges upon the radial vanes 152 while expanding within the chamber cavities and thereby causing rotation of the motor rotor hub 136. Spent gas is progressively exhausted through the sequentially increased gas exhaust port 158 as previously described.

FIG. 17 shows an external rear elevation view of a motor housing 170 similar to the housing 150 shown in FIG. 14 and containing still another structural variation for a sequentially increased exhaust port 172 comprising a triangular opening where the upper apex half of the triangular opening is predominantly located in the third quadrant and the lower base half of the triangular opening is located in the fourth quadrant relative to the gas input ports 164. In a manner similar to the progressive exhaust ports 138,140 shown in motor housing 132 in FIG. 11 and continuous progressive exhaust port 158 shown in FIG. 14, the triangular exhaust port 172 shown in motor housing 170 in FIG. 17 permits limited spent gas to be exhausted through the upper apex section to avoid recompression of the spent gas, but retains a majority of the spent gas until expelled through the much larger lower base section of the triangular exhaust port 172. The gas is thus exhausted in a continuous increased amount.

Accordingly, it is readily seen that sequentially increased exhaust port systems shown in FIGS. 11–17 efficiently utilize the maximum amount of gas throughput to rotate the motor rotor, but progressively permit spent gas to be exhausted in a controlled continuous basis on an increasing gradient to avoid undesirable recompression of spent gas, but simultaneously retain and utilize the gas to the last instance before recompression to increase power output of the pneumatic motor of this invention.

While in accordance with the Patent Statutes, the best mode and preferred embodiment has been set forth, the scope of the invention is not limited thereto, but rather by the scope of the attached claims.

What is claimed is:

1. A portable, pneumatic-powered, rotary vane motor adapted to operate a rotary tool, the motor comprising:

a pneumatic-powered, radial-vane rotary motor having a housing containing a cylindrical stator, said cylindrical stator having an inner surface defining a stator chamber, a circular rotor hub operatively supported by the housing and eccentrically set within the cylindrical stator, said motor housing being circular and the axis of the rotor hub being offset from the axis of said circular housing, said rotor hub containing a plurality of circumferentially spaced, radially directed slots, each slot containing a radially directed vane adapted to extend radially outward to bear against the inner surface of the cylindrical stator during rotary movement of the rotor hub whereby said radially extended vanes define a plurality of expansible cavities within the stator chamber, a sealing point located between said rotor hub and said inner surface of said cylindrical stator whereby said vanes are maximally retracted at said sealing point;

a gas inlet port communicating with the interior of said stator chamber and located circumferentially adjacent to said sealing point between the rotor hub and the inner surface of the cylindrical stator, said gas inlet port adapted to admit gas under pressure to said expansible cavities within the stator chamber; and a gas outlet port communicating with stator chamber and located at least 180 circumferential degrees from the gas inlet port, said gas outlet adapted to exhaust spent gas from said expansible cavities.

2. The portable rotary motor of claim 1, wherein the axis of the cylindrical stator approximately coincides with the axis of said housing.

3. The portable rotary motor of claim 1, wherein said gas outlet port comprises sequentially increased exhaust means for exhausting gas from said motor.

4. The portable rotary motor of claim 3, wherein said sequentially increased exhaust means comprises at least one small exhaust port and at least one large exhaust port, and wherein said large exhaust port is circumferentially spaced beyond the small exhaust port.

5. The portable rotary motor of claim 4, wherein said sequentially increased exhaust means comprises two small exhaust ports circumferentially spaced and two large exhaust ports longitudinally spaced, and wherein said large exhaust ports are circumferentially spaced from said small exhaust ports.

6. The portable rotary motor of claim 3, wherein said sequentially increased exhaust means comprises an elongated circumferential opening progressing into an enlarged longitudinal opening.

7. The portable rotary motor of claim 6, wherein said sequentially increased exhaust means comprises an inverted T-shaped opening where said longitudinal opening is circumferentially beyond said circumferential opening.

8. The portable rotary motor of claim 3, wherein said sequentially increased exhaust means comprises a triangular opening where the base thereof is circumferentially spaced from the apex of said triangular opening.

9. The portable rotary motor of claim 2, wherein said gas outlet port comprises sequentially increased exhaust means for exhausting gas from said motor.

10. The portable rotary motor of claim 9, wherein said sequentially increased exhaust means comprises at least one small exhaust port and at least one large exhaust port, and wherein said large exhaust port is circumferentially spaced beyond the small exhaust port.

11. The portable rotary motor of claim 10, wherein said sequentially increased exhaust means comprises two small exhaust ports circumferentially spaced and two large exhaust ports longitudinally spaced, and wherein said large exhaust ports are circumferentially spaced from said small exhaust ports.

12. The portable rotary motor of claim 9, wherein said sequentially increased exhaust means comprises an elongated circumferential opening progressing into an enlarged longitudinal opening.

13. The portable rotary motor of claim 12, wherein said sequentially increased exhaust means comprises an inverted T-shaped opening where said longitudinal opening is circumferentially beyond said circumferential opening.

14. The portable rotary motor of claim 9, wherein said sequentially increased exhaust means comprises a triangular opening where the base thereof is circumferentially spaced from the apex of said triangular opening.

15. The portable rotary motor of claim 1, wherein said housing contains a thin wall sleeve.

16. The portable rotary motor of claim 1, in combination with a rotary milling head operatively connected to said rotary motor, said milling head adapted to mill a surface on an end of a tubular workpiece, and said milling head containing a non-locking pilot tube means extending forwardly for insertion into the end of the tubular workpiece to maintain axial alignment of the milling head with the tubular workpiece.

17. The portable rotary motor of claim 3, in combination with a rotary milling head operatively connected to said rotary motor, said milling head adapted to mill a surface on an end of a tubular workpiece, and said milling head containing a non-locking pilot tube means extending forwardly for insertion into the end of the tubular workpiece to maintain axial alignment of the milling head with the tubular workpiece.

18. The portable rotary motor of claim 4, in combination with a rotary milling head operatively connected to said rotary motor, said milling head adapted to mill a surface on an end of a tubular workpiece, and said milling head containing a non-locking pilot tube means extending forwardly for insertion into the end of the tubular workpiece to maintain axial alignment of the milling head with the tubular workpiece.

19. The portable rotary motor of claim 6, in combination with a rotary milling head operatively connected to said rotary motor, said milling head adapted to mill a surface on an end of a tubular workpiece, and said milling head containing a non-locking pilot tube means extending forwardly for insertion into the end of the tubular workpiece to maintain axial alignment of the milling head with the tubular workpiece.

20. The portable rotary motor of claim 8, in combination with a rotary milling head operatively connected to said rotary motor, said milling head adapted to mill a surface on an end of a tubular workpiece, and said milling head containing a non-locking pilot tube means extending forwardly for insertion into the end of the tubular workpiece to maintain axial alignment of the milling head with the tubular workpiece.

21. The portable rotary motor of claim 10, in combination with a rotary milling head operatively connected to said rotary motor, said milling head adapted to mill a surface on an end of a tubular workpiece, and said milling head containing a non-locking pilot tube means extending forwardly for insertion into the end of the tubular workpiece to maintain axial alignment of the milling head with the tubular workpiece.

22. The portable rotary motor of claim 12, in combination with a rotary milling head operatively connected to said rotary motor, said milling head adapted to mill a surface on an end of a tubular workpiece, and said milling head containing a non-locking pilot tube means extending forwardly for insertion into the end of the tubular workpiece to maintain axial alignment of the milling head with the tubular workpiece.

23. The portable rotary motor of claim 14, in combination with a rotary milling head operatively connected to said rotary motor, said milling head adapted to mill a surface on an end of a tubular workpiece, and said milling head containing a non-locking pilot tube means extending forwardly for insertion into the end of the tubular workpiece to maintain axial alignment of the milling head with the tubular workpiece.

24. The portable rotary motor of claim 1, wherein the ratio of the axial length of said rotor hub to said stator diameter is from about 1.2 to about 2.0 and wherein said motor is capable of rotating at from about 3,000 to about 6,000 rpm when utilizing an air pressure of about 90 psig.

25. The portable rotary motor of claim 6, wherein the ratio of the axial length of said rotor hub to said stator diameter is from about 1.2 to about 2.0 and wherein said motor is capable of rotating at from about 3,000 to about 6,000 rpm when utilizing an air pressure of about 90 psig.

26. The portable rotary motor of claim 21, wherein the ratio of the axial length of said rotor hub to said stator diameter is from about 1.2 to about 2.0 and wherein said motor is capable of rotating at from about 3,000 to about 6,000 rpm when utilizing an air pressure of about 90 psig.

27. The portable rotary motor of claim 22, wherein the ratio of the axial length of said rotor hub to said stator diameter is from about 1.2 to about 2.0 and wherein said motor is capable of rotating at from about 3,000 to about 6,000 rpm when utilizing an air pressure of about 90 psig.

28. The portable rotary motor of claim 23, wherein the ratio of the axial length of said rotor hub to said stator diameter is from about 1.2 to about 2.0 and wherein said motor is capable of rotating at from about 3,000 to about 6,000 rpm when utilizing an air pressure of about 90 psig.

29. A portable, pneumatic-powered, rotary vane motor adapted to operate a rotary tool, said motor comprising:
- a housing containing a cylindrical stator, said stator having an inner surface defining a stator chamber;
- a circular rotor hub operatively supported by the housing and set within said stator, said rotor hub containing a plurality of circumferentially spaced, radially directed slots, said slots each containing a radially directed vane of the motor extending radially outward and bearing against the inner surface of the cylindrical stator during rotary movement of the rotor hub whereby said radially extending vanes define a plurality of expansible cavities within the stator chamber and a sealing point is located between said rotor hub and said inner surface so that said vanes are maximally retracted at said sealing point;
- a gas inlet port formed in the housing and communicating with the stator chamber, said inlet port being located circumferentially adjacent to said sealing point for admitting gas under pressure to said expansible cavities within the stator chamber; and
- sequentially circumferential increased exhaust means formed in the housing and communicating with the stator chamber for exhausting spent gas from said expansible cavities, said exhaust means being located at least 180 circumferential degrees from the gas inlet port.

30. The portable rotary motor of claim 29, in which the sequentially increased exhaust means comprises at least one small exhaust port located in the third quadrant of the housing and at least one large exhaust port located in the fourth quadrant of the housing.

31. The portable rotary motor of claim 30, in which up to about 25 percent by volume of spent gas is exhausted through the small exhaust port located about 180 circumferential degrees to about 270 degrees from the gas inlet port.

32. The portable rotary motor of claim 31, in which a substantial amount of the remaining spent gas is exhausted through the large exhaust port located about 270 circumferential degrees to about 330 degrees from the gas inlet port.

33. The portable rotary motor of claim 32, in which the ratio of the axial length of said rotor hub to said stator diameter is from about 1.2 to about 2.0, and in which said motor is capable of rotating at from about 3,000 to about 6,000 rpm when utilizing an air pressure of about 90 psig.

34. The portable rotary motor of claim 33, in combination with a rotary milling head operatively connected to said rotary motor, said milling head adapted to mill a surface on an end of a tubular workpiece, and said milling head containing a non-locking pilot tube means extending forwardly for insertion into the end of the tubular workpiece to maintain axial alignment of the milling head with the tubular workpiece.

35. The portable rotary motor of claim 34, in which the circular rotor hub is eccentrically set within the cylindrical stator.

36. The portable rotary motor of claim 35, in which the motor housing is circular; in which the axis of the cylindrical stator generally coincides with the axis of said housing; and in which the axis of the rotor hub is offset from the generally coincidental axes of said stator and housing.

37. The portable rotary motor of claim 30, in which said sequentially increased exhaust means comprises at least one small exhaust port and at least one large exhaust port, and wherein said large exhaust port is circumferentially spaced beyond the small exhaust port.

38. The portable rotary motor of claim 30, in which said sequentially increased exhaust means comprises an elongated circumferential opening progressing into an enlarged longitudinal opening.

39. The portable rotary motor of claim 30, in which said sequentially increased exhaust means comprises a triangular opening where the base thereof is circumferentially spaced from the apex of said triangular opening.

40. The portable rotary motor of claim 32, in which said sequentially increased exhaust means comprises at least one small exhaust port and at least one large exhaust port, and wherein said large exhaust port is circumferentially spaced beyond the small exhaust port.

41. The portable rotary motor of claim 32, in which said sequentially increased exhaust means comprises an elongated circumferential opening progressing into an enlarged longitudinal opening.

42. The portable rotary motor of claim 32, in which said sequentially increased exhaust means comprises a triangular opening where the base thereof is circumferentially spaced from the apex of said triangular opening.

43. The portable rotary motor of claim 30, wherein said sequentially increased exhaust means comprises two small exhaust ports circumferentially spaced and two large exhaust ports longitudinally spaced, and wherein said large exhaust ports are circumferentially spaced from said small exhaust ports.

44. The portable rotary motor of claim 30, wherein said sequentially increased exhaust means comprises an inverted T-shaped opening where said longitudinal opening is circumferentially beyond said circumferential opening.

45. The portable rotary motor of claim 32, wherein said sequentially increased exhaust means comprises two small exhaust ports circumferentially spaced and two large exhaust ports longitudinally spaced, and wherein said large exhaust ports are circumferentially spaced from said small exhaust ports.

46. The portable rotary motor of claim 32, wherein said sequentially increased exhaust means comprises and inverted T-shaped opening where said longitudinal opening is circumferentially beyond said circumferential opening.

47. The portable rotary motor of claim 34, wherein said sequentially increased exhaust means comprises at least one small exhaust port and at least one large exhaust port, and wherein said large exhaust port is circumferentially spaced beyond the small exhaust port.

48. The portable rotary motor of claim 34, wherein said sequentially increased exhaust means comprises two small exhaust ports circumferentially spaced and two large exhaust ports longitudinally spaced, and wherein said large exhaust ports are circumferentially spaced from said small exhaust ports.

49. The portable rotary motor of claim 34, wherein said sequentially increased exhaust means comprises an elongated circumferential opening progressing into an enlarged longitudinal opening.

50. The portable rotary motor of claim 34, wherein said sequentially increased exhaust means comprises an inverted T-shaped opening where said longitudinal opening is circumferentially beyond said circumferential opening.

51. The portable rotary motor of claim 34, wherein said sequentially increased exhaust means comprises a triangular opening where the base thereof is circumferentially spaced from the apex of said triangular opening.

52. The portable rotary motor of claim 29, wherein said sequentially increased exhaust means comprises at least one small exhaust port and at least one large exhaust port, and wherein said large exhaust port is circumferentially spaced beyond the small exhaust port.

53. The portable rotary motor of claim 29, wherein said sequentially increased exhaust means comprises two small exhaust ports circumferentially spaced and two large exhaust ports longitudinally spaced, and wherein said large exhaust ports are circumferentially spaced from said small exhaust ports.

54. The portable rotary motor of claim 29, wherein said sequentially increased exhaust means comprises an elongated circumferential opening progressing into an enlarged longitudinal opening.

55. The portable rotary motor of claim 29, wherein said sequentially increased exhaust means comprises an inverted T-shaped opening where said longitudinal opening is circumferentially beyond said circumferential opening.

56. The portable rotary motor of claim 29, wherein said sequentially increased exhaust means comprises a triangular opening where the base thereof is circumferentially spaced from the apex of said triangular opening.

* * * * *